(12) United States Patent
Janakiraman et al.

(10) Patent No.: US 11,929,885 B2
(45) Date of Patent: Mar. 12, 2024

(54) SITUATION AWARE EDGE ANALYTICS FRAMEWORK FOR COMMUNICATION SYSTEMS

(71) Applicant: Honeywell International Inc., Charlotte, NC (US)

(72) Inventors: Kirupakar Janakiraman, Madurai (IN); Aloke Roy, Gaithersburg, MD (US); Ramkumar Rajendran, Madurai TN (IN); Pavel Drasil, Brno (CZ); Prasanna M R H, Madurai TN (IN); Cosmin Mihai, Brno BM (CZ)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/714,851

(22) Filed: Apr. 6, 2022

(65) Prior Publication Data

US 2023/0254219 A1 Aug. 10, 2023

(30) Foreign Application Priority Data

Feb. 10, 2022 (IN) .............................. 202211007077

(51) Int. Cl.
*H04L 41/14* (2022.01)
*G06F 18/20* (2023.01)
(Continued)

(52) U.S. Cl.
CPC ........ *H04L 41/145* (2013.01); *G06F 18/2135* (2023.01); *G06F 18/2321* (2023.01);
(Continued)

(58) Field of Classification Search
CPC ....... H04L 41/145; H04L 41/12; H04L 41/16; G06F 18/2135; G06F 18/2321; G06F 18/295
See application file for complete search history.

(56) References Cited

U.S. PATENT DOCUMENTS 10,693,578 B1 6/2020 Shapiro et al.
10,873,533 B1 * 12/2020 Ismailsheriff ........... H04L 47/29
(Continued)

FOREIGN PATENT DOCUMENTS

| CN | 111899076 A | 11/2020 |
| CN | 112101767 A | 12/2020 |
| CN | 113301654 A | 8/2021 |

OTHER PUBLICATIONS

European Patent Office, "Extended European Search Report", from EP Application No. 23152917.3, from Foreign Counterpart to U.S. Appl. No. 17/714,851, dated Jun. 22, 2023, pp. 1 through 12, Published: EP.

*Primary Examiner* — John A Follansbee
*Assistant Examiner* — Fadi Haj Said
(74) *Attorney, Agent, or Firm* — Fogg & Powers LLC

(57) ABSTRACT

Systems and methods for a situation aware edge analytics framework for communication systems. In certain embodiments, a method includes receiving an analytical model from an external server at a mobile edge node. Further, the method includes acquiring situation information for the mobile edge node from at least one component on the mobile edge node. Moreover, the method includes providing the situation information to the analytical model executing on the mobile edge node. Also, identifying a change in one or more communication link states based on an output of the analytical model. Additionally, transmitting the output of the analytical model to the external server. The method also includes receiving an additional analytical model from the external server by the mobile edge node, where the additional analytical model is based on the output of the analytical model.

15 Claims, 9 Drawing Sheets

(51) Int. Cl.
  *G06F 18/2135* (2023.01)
  *G06F 18/2321* (2023.01)
  *H04L 41/12* (2022.01)
  *H04L 41/16* (2022.01)

(52) U.S. Cl.
  CPC ............ *G06F 18/295* (2023.01); *H04L 41/12* (2013.01); *H04L 41/16* (2013.01)

(56) References Cited

U.S. PATENT DOCUMENTS

| | | | |
|---|---|---|---|
| 11,097,853 B2 | 8/2021 | Li et al. | |
| 2018/0032915 A1* | 2/2018 | Nagaraju | G06V 10/95 |
| 2019/0171169 A1 | 6/2019 | Di Pietro et al. | |
| 2019/0361466 A1 | 11/2019 | Obropta, Jr. et al. | |
| 2020/0013159 A1 | 1/2020 | Ito | |
| 2020/0084113 A1 | 3/2020 | Joshi et al. | |
| 2020/0145337 A1 | 5/2020 | Keating et al. | |
| 2020/0207375 A1* | 7/2020 | Mehta | G06V 20/56 |
| 2020/0327371 A1 | 10/2020 | Sharma et al. | |
| 2021/0134162 A1 | 5/2021 | Sundaramurthy et al. | |
| 2021/0287115 A1* | 9/2021 | Woods | H04L 41/149 |
| 2022/0150727 A1* | 5/2022 | Pezeshki | H04L 41/145 |
| 2023/0007564 A1* | 1/2023 | Balasubramanian | H04W 40/18 |

\* cited by examiner

SITUATION AWARE EDGE ANALYTICS FRAMEWORK FOR COMMUNICATION SYSTEMS

CROSS-REFERENCE TO RELATED APPLICATIONS

The present application claims benefit of Indian Patent Application Serial No. 202211007077 filed Feb. 10, 2022; the entire contents of the aforementioned patent application is incorporated herein by reference as if set forth in its entirety.

BACKGROUND

Many systems rely on communication links for exchanging information. Further, some communication links provide critical functions that enable the operation of these systems. For example, unmanned or remotely piloted aircraft use communication systems to provide reliable, secure, adaptive, and cost-optimized, end-to-end information exchange. High integrity communication systems (HICS) allow systems to use multiple communication links. Further, HICS can control the operation of multiple communication links while reducing operating costs for the system and improving the quality of service.

SUMMARY

Systems and methods for a situation aware edge analytics framework for communication systems. In certain embodiments, a method includes receiving an analytical model from an external server at a mobile edge node. Further, the method includes acquiring situation information for the mobile edge node from at least one component on the mobile edge node. Moreover, the method includes providing the situation information to the analytical model executing on the mobile edge node. Also, identifying a change in one or more communication link states based on an output of the analytical model. Additionally, transmitting the output of the analytical model to the external server. The method also includes receiving an additional analytical model from the external server by the mobile edge node, where the additional analytical model is based on the output of the analytical model.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Figure 1:
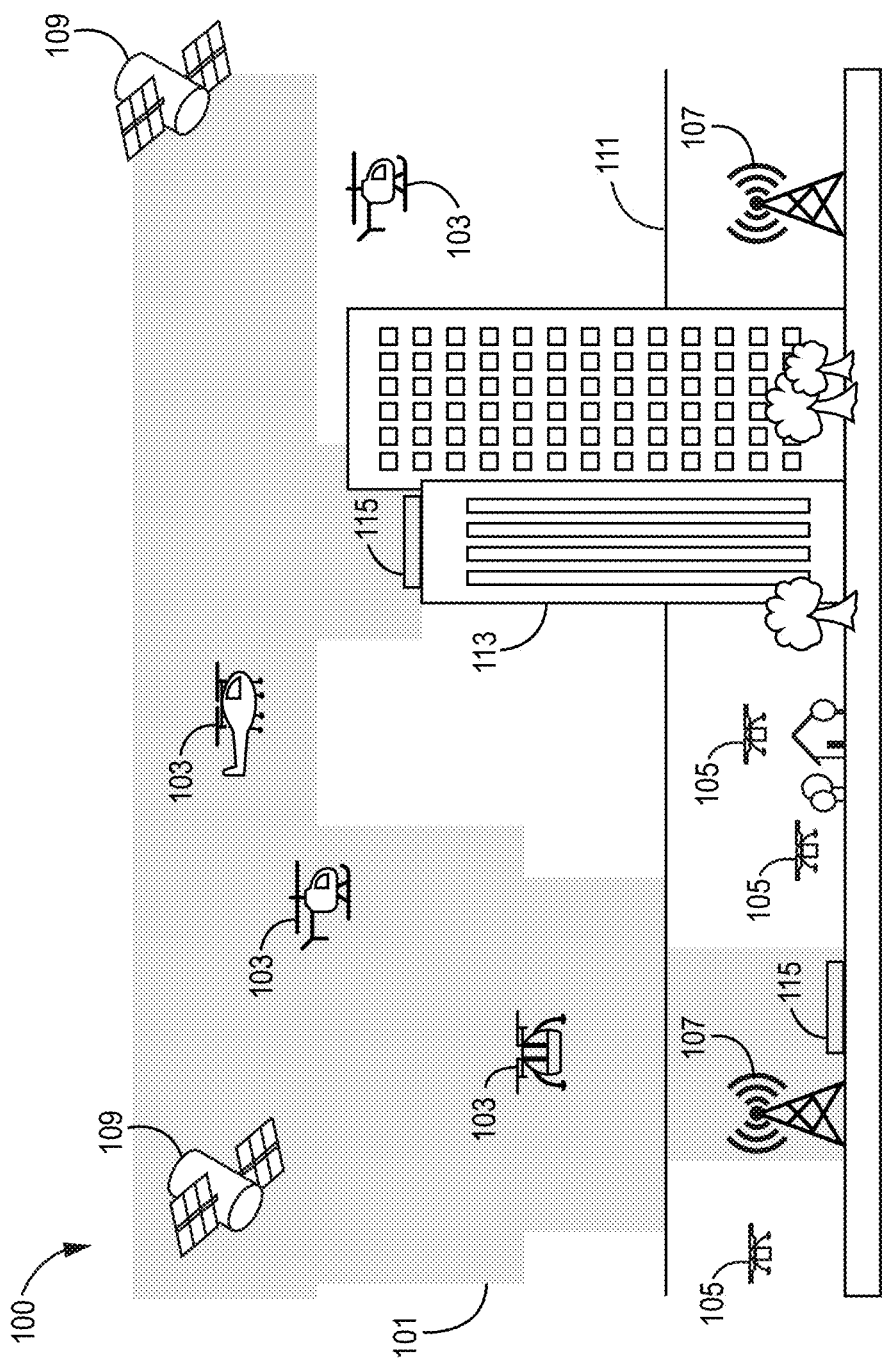
FIG. 1 is a diagram illustrating the operation of aircraft within an urban environment typical of environments where systems operate according to an aspect of the present disclosure.

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

The present disclosure describes systems and methods for providing a situation aware edge analytics framework for communication systems. The situation aware edge analytics framework includes a complex event processing engine that uses machine learning to predict parameters of future flight states. The situation aware edge analytics framework then uses these predicted flight states to identify which communication links to use at different points within a flight A typical system searches for a communication link that meets desired performance metrics and satisfying policy constraints by tuning to each communication link channel in a group of available channels. The system may perform this task continuously during operation. Besides finding a communication link having the desired performance metrics, the system may also attempt to identify a channel providing the desired cost. Tuning to the various channels while searching for a communication link that meets the desired goals is often time consuming. Additionally, during the tuning of the system to the different data link channels, the system may experience temporary losses of connectivity. These temporary losses can accumulate over time, causing significant downtime throughout system operation. Further, as a system moves about certain environments, frequent environmental changes may interfere with and affect the quality provided by certain communication links. While static models may predict data link channels, static models inefficiently address frequent environmental changes even with frequent model updates.

The present disclosure describes systems and methods for a situation aware edge analytics framework for selecting communication systems. In certain embodiments, components on a vehicle gather data that describes the situation of the vehicle. A processor on the vehicle uses the gathered data as an input to a model that predicts which of the data link channels should be used for communication based on the data and policies that govern the communication for the different vehicles. Additionally, the processor can transmit the output of the model to an external server, which then uses the data as training data for improving additional models. The external server then deploys the additional models for execution on the vehicle and other vehicles. Using the models to predict data link channels can help reduce connectivity down time, latency, and cost for vehicle communications. Also, by generating and deploying additional models, created using data gathered by different vehicles, environmental changes can be addressed efficiently at both micro and macro levels.

FIG. 1 is a diagram illustrating the operation of aerial vehicles within an urban airspace 100 and the interaction between different environments in the urban airspace 100. As illustrated, within an urban airspace 100, multiple aircraft may operate at a time. For example, the aircraft may include unmanned aircraft systems (UAS) 105, urban air mobility (UAM) vehicles 103, and other aerial vehicles (airplanes, missiles, and other aircraft, which are not illustrated). Different operational zones may be established to manage the operation of the various aircraft within the urban airspace 100, where different policies direct the operation of and communication by vehicles operating within a particular zone. For example, an operational zone may include a UAM operating environment (UOE) 101, a UAS traffic management (UTM) environment 111, and an air traffic management airspace.

In certain embodiments, the UTM environment governs the operation of the UAS 105. The UAS 105 may include small unmanned aircraft, which are limited to operation within the UTM environment 111. In some implementations, the UTM environment 111 may include an area between ground level and a UTM ceiling. For example, the UTM ceiling may be defined at 400 feet above ground level. Within the envelope of the UTM environment 111, the UAS 105 operates according to regulations associated with UTM environments 111. If a UAS 105 were to leave the UTM 111 into a neighboring zone, the UAS 105 would operate according to regulations associated with that neighboring zone.

In additional embodiments, the UOE 101 may define corridors where UAMs 103 are permitted to operate while following regulations associated with UAMs 103. As used herein, UAMs 103 are aircraft that can transport individuals and freight within the urban airspace 100. In some implementations, UAMs 103 take off and land at aerodromes 115. As used herein, an aerodrome 115 may be a facility at a particular location that supports the operation of UAMs 103. During operation, a UAM 103 may take off from an aerodrome 115 and ascend into a corridor of the UOE 101 along a defined access path. As used herein, the corridor of the UOE 101 is an airspace volume defining a three-dimensional route segment with UAM performance requirements that must be met for aircraft to operate within the corridor of the UOE 101. Additionally, typical air traffic control separation services are not provided within the corridor of the UOE 101. The UAM 103 may then travel through the corridor of the UOE 101 until the UAM 103 reaches a region associated with a destination aerodrome 115. Upon reaching the destination, the UAM 103 descends through a destination access path for the UOE 101 to land at the destination aerodrome 115.

As the access paths of the UOE 101 may extend through the UTM environment 111 to reach the aerodromes 115, the access paths are governed by regulations associated with the UOE 101. While these access paths extend through the UTM environment 111, UAS 105 may not be allowed to enter the airspace associated with the access paths unless the controller for the UAS 105 coordinates the entrance with the service provider that manages the air space associated with the access paths.

In additional embodiments, the UOE 101 may extend over urban areas 113. These urban areas may include buildings or other structures that extend through the UTM environment 111. Also, the structures may have aerodromes 115 located on the buildings above the UTM environment 111. Thus, UAMs may land at the aerodromes 115 above the UTM environment 111 without traveling along access paths that descend through the UTM environment 111.

In certain embodiments, to coordinate the operation of the UAMs 103, the UAS 105, and other aircraft moving outside or within the UOE 101 or the UTM environment 111 may communicate through various communication links with each other or with their respective controllers. The aircraft may communicate with ground communication systems 107 and aerial- or space-based communication systems 109. The ground communication systems 107 and aerial-based communication systems 109 may facilitate communications using VHF, HF, SATCOM, C-Band, mmWave, 4G/5G cellular, L-band terrestrial, Wi-Fi, Ka/Ku-band SATCOM, free-space-optical (FSO), and other communication technologies. In some implementations, the environments of the UOE 101 and the UTM environment 111 may be subject to dynamic changes and communication coverage gaps. Further, the safe operation of the UAMs 103 and UAS 105 may rely on dependable communication links. Thus, the UAMs 103 and UAS 105 include embodiments of systems that identify and predict communication channels with good signal strength and dependability to avoid significant connectivity downtime and low switching latency, irrespective of possible operational challenges.

Figure 2:
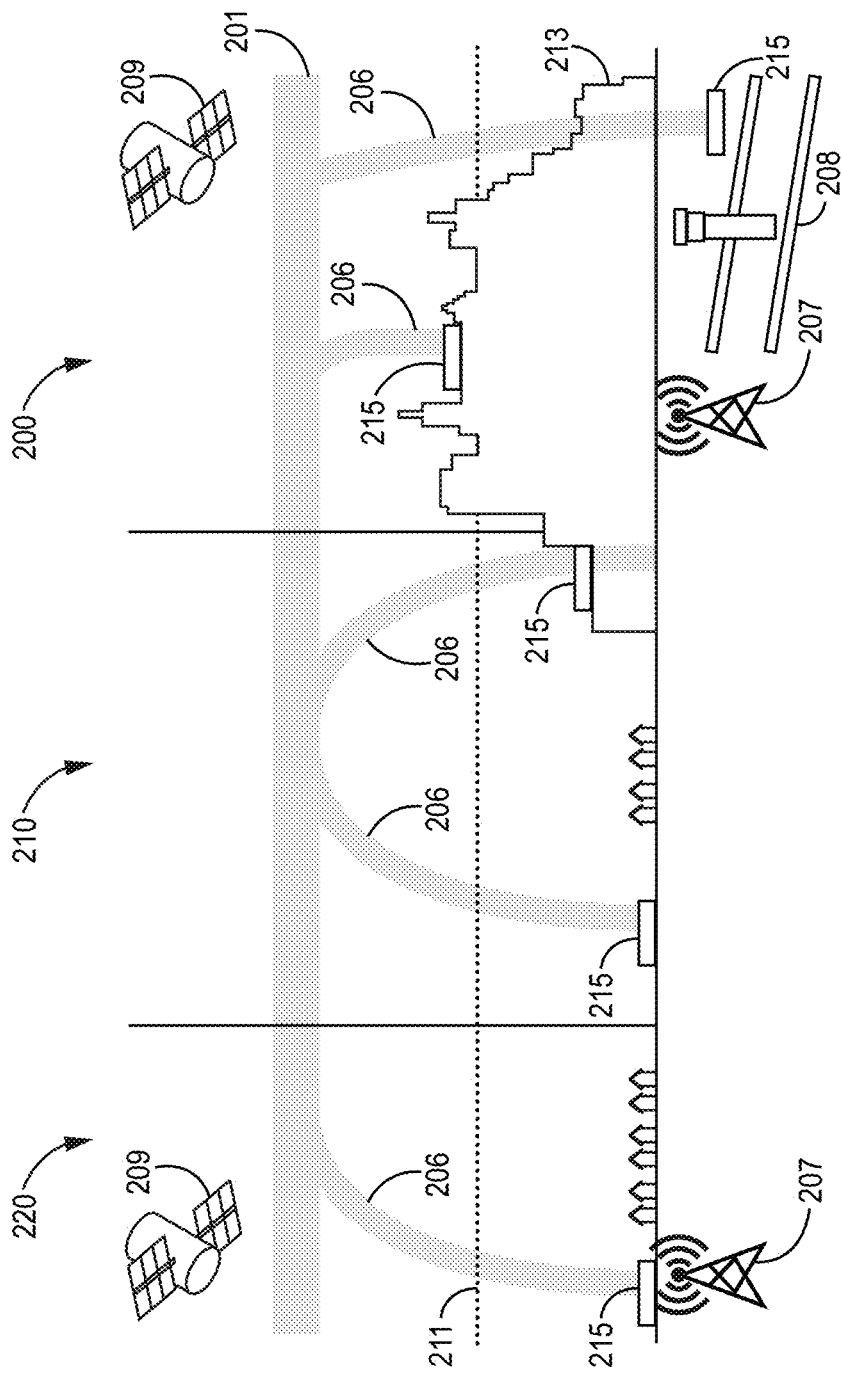
FIG. 2 is a diagram illustrating the operation of aircraft across multiple environments subject to different policies and constraints where systems operate according to an aspect of the present disclosure.

FIG. 2 is a diagram illustrating a UOE 201 and a UTM environment 211 extending into environments with different airspace classes. The UOE 201 and the UTM environment 211 may extend outside of the urban environment described above regarding the UOE 101 and the UTM environment 111 in FIG. 1. The aerial-based communication system 209 and the ground communication system 207 are respectively similar to the aerial-based communication systems 109 and the ground communication systems 107. Similarly, the aerodromes 215 are similar to the aerodromes 115 in FIG. 1.

In certain embodiments, different regions may have different airspace classes. For example, class 200 may be similar to the urban airspace 100. As such, aircraft that operate outside the UOE 201 but within the airspace associated with the class 200 follow regulations associated with the airspace class 200. For example, the class 200 may include an airport 208 and an urban area 213. Thus, aircraft operating within the class 200 may be subject to rules associated with airspace above airports 208 and urban areas 113. For example, the class 200 may be airspace class B.

In additional embodiments, the airspace class 210 may be associated with airspace over suburban, residential, exurbs, towns, or other similar non-urban areas. Over these areas, aircraft may operate under different rules. For example, airspace class 210 may be airspace class C/D/E. Further, airspace class 220 may be associated with airspace over rural or other lightly settled areas. For example, the airspace class 220 may be airspace class G.

As shown, the UOE 201 may extend through the different airspace classes 200, 210, and 220. Similarly, the UTM environment 211 may also extend through the different airspace classes 200, 210, and 220. Even though the UOE 201 extends through the different airspace classes 200, aircraft operating within the UOE 201 operate according to UAM specific rules, procedures, and performance requirements regardless of the airspace class. When an aircraft leaves the UOE 201, the aircraft operate according to the rules associated with the encompassing airspace class. Similarly, aircraft operating within the UTM environment 211 operate according to rules associated with UTM operations. However, access paths 206 extend the corridor of the UOE 201 through the UTM environment 211 to allow UAM vehicles to land at associated aerodromes 215.

As described, navigating aircraft are subject to different policies that depend on the location of the aircraft. Whether the aircraft are within the UOE 201, UTM environment 211, or one of the classes 200, 210, and 220 determines which rules and regulations govern the operation of the aircraft. As the aircraft are subject to different governing rules and regulations, predictive models executing on the aircraft may use the location-dependent policies as an input to predict which ground communication systems 207 and aerial-based communication systems 209 should be used by the aircraft.

Figure 3:
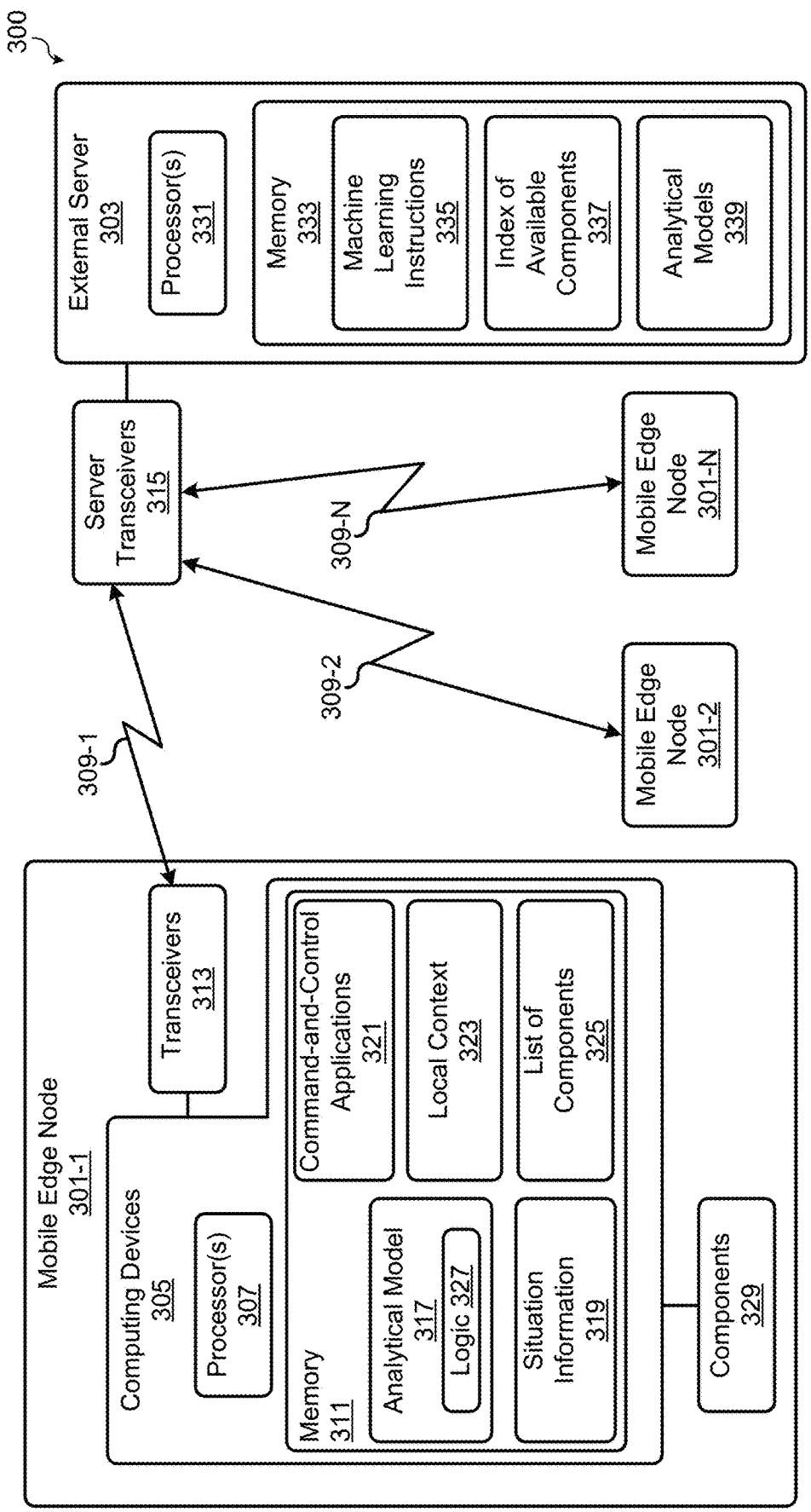
FIG. 3 is a block diagram illustrating a system for providing a situation aware edge analytics framework for communication systems according to an aspect of the present disclosure.

FIG. 3 is a block diagram of a network 300 that includes mobile edge nodes 301 and an external server 303 that provides a framework for predicting the availability and capability of communication links based on situational information acquired by the mobile edge nodes 301. As shown, the network 300 includes mobile edge nodes 301-1, 301-2, and 301-N that respectively communicate through communication links 309-1, 309-2, and 309-N with the external server 303. As described herein, the mobile edge nodes 301-1, 301-2, and 301-N may be referred to collectively and generally as mobile edge node 301 or mobile edge nodes 301. Similarly, the communication links 309-1, 309-2, and 309-N may be referred to collectively and generally as communication links 309. The mobile edge node 301 may be a mobile platform that communicates through one or more communication links 309. For example, mobile edge nodes 301 may include airplanes, drones, helicopters, UAM vehicles, UAS vehicles, missiles, rockets, cars, trains, boats, and the like. The communication links 309 may include communication technologies that enable communication between a mobile edge node 301 and the external server 303. For example, the communication links 309 may be VHF, HF, SATCOM, C-Band, mmWave, 4G/5G cellular, L-band terrestrial, Wi-Fi, Ka/Ku-band SATCOM, FSO, and other communication links.

In certain embodiments, a mobile edge node 301 includes one or more computing devices 305, one or more transceivers 313, and various other system components 329. The one or more transceivers 313 are coupled to the computing devices 305 and allow the mobile edge node 301 to communicate through the various communication links 309 with the external server 303 and associated server transceivers 315. The one or more computing devices 305 are coupled to the one or more transceivers 313 and can receive data from the external server 303 and transmit data to the external server 303 through the one or more transceivers 313. The computing devices 305 are also coupled to the various system components 329 on the mobile edge node 301.

In exemplary embodiments, the system components 329 may perform functions that support the operation of the mobile edge node 301. Some of the components 329 provide information to the one or more computing devices 305 regarding the operation of the different components 329. Additionally, some of the other components 329 within the mobile edge node 301 acquire information about the environment of the mobile edge node 301 or the relation of the mobile edge node 301 to the environment of the mobile edge node 301. For example, the information of the environment may include navigation information for the mobile edge node 301, weather information, information about the position of proximate objects, information about available communication links 309, and the like. Further, the components 329 may include software modules, hardware devices, or combinations of hardware/software that can acquire information. The components 329 may also include sensors such as inertial sensors, altimeters, velocimeters, hygrometers, barometers, software algorithms that monitor communication link performance, sensors that monitor internal systems of the mobile edge node 301, and the like.

The computing devices 305 acquire the information from the components 329 and store the information on memory 311 as situation information 319. For example, the situation information 319 may include latitude of the mobile edge node 301, longitude of the mobile edge node 301, heading of the mobile edge node 301; altitude of the mobile edge node 301, contextual weather details, operational flight plans, flight corridor plan, signal strength of the communication links 309, operation status information of the components 329, and other information related to the operation and environment of the mobile edge node 301.

In some embodiments, the one or more computing devices 305 includes one or more processors 307 that execute various instructions to control the operation of the mobile edge node 301. As part of the operation of the mobile edge node 301, the processors 307 execute instructions to predict which link in the communication links 309 to use for communicating with other systems, be the other systems the external server 303, other mobile edge nodes 301, or other ground-based transmitters (such as a service provider, aircraft manager, ATC center, and the like). However, as the mobile edge node moves through an environment, different situations may affect the availability of different communication links 309. As the environment may rapidly change for navigating mobile edge nodes 301 like UAM vehicles, similar to the UAMs 103 or the UAS 105 in FIG. 1, the availability of different communication links 309 may change as the UAMs move through the UOE or the UAS move through a UTM environment. Because of the change in the availability of the communication links 309, the mobile edge nodes 301 use analytical models to predict when to switch to various communication link 309 technologies as the communication link 309 availability changes. Accordingly, using models to predict switching between communication links 309 significantly reduces the amount of accumulated connectivity downtime, which downtime may negatively affect the operation of the mobile edge nodes 301.

In certain embodiments, the external server 303 may be coupled to one or more server transceivers 315. The one or more server transceivers 315 facilitates communications between the one or more mobile edge nodes 301 and the external server 303 using one or more of the available communication links 309. In some embodiments, the one or more server transceivers 315 may be part of the external server 303. Further, the external server 303, like mobile edge node 301, may include one or more processors 331 and a memory 333. The processors 331 executes instructions stored in the memory 333 that help the external server 303 create analytical models and transmit the analytical models to the mobile edge nodes 301.

In exemplary embodiments, the mobile edge node 301 receives one or more analytical models from the external server 303, where the mobile edge node 301 stores the received analytical models as analytical model 317 on the memory 311. The one or more processors 307 can execute the analytical model 317 using stored situation information 319 as an input. As used herein, when the mobile edge node 301 executes the analytical model 317, the processor 307 may use stored situation information 319 or recently acquired situation information as an input for the analytical model 317. The analytical model 317 then provides an output that includes predictions or detects present communication link states. The mobile edge node 301 may use the predictions and detections to reduce connectivity downtime and switching latency irrespective of potential challenges that arise during the operation of the mobile edge node 301.

In some embodiments, in addition to the predictions or detections of the present communication link states, the output of the analytical model 317 includes information for transmission to the external server 303. The one or more processors 307 may then transmit some or all of the output to the external server 303. The transmissions from the one or more processors 307 to the external server 303 may include the predicted or detected present communication link states. Additionally, the transmissions may also include information derived from the situation information 319.

In further embodiments, the analytical model 317 may include logic 327 that derives situational context from the situation information. For example, the logic 327 may include one or more rule sets, complex domain expressions for the situation information 319, and policy details. The analytical model 317 receives the situation information 319 produced by the components 329, either stored on the memory 311 or directly from the components 329. The situational context includes information that describes the present state of the mobile edge node 301 and the communication links 309, information that indicates causes of the present state, and information that describes expected future states of the mobile edge node 301 and the communication links 309.

In exemplary embodiments, the logic 327 may arrange the information to be transmitted to the external server 303 in a communicable form. As used herein, a communicable form is a defined format for the information that can be readily processed by the one or more processors 331 on the external server 303. For example, the logic 327 may arrange the outputs from the analytical model 317 in a tuple, using regular expressions, in a pre-defined format for a message, and the like. When the output is arranged in a tuple, the tuple may include local context, state parameters for the mobile edge node 301, and parameters for one or more communication links 309. When the external server 303 receives the transmission from the mobile edge node 301, the one or more processors 331 may process the data and identify the situational context in the received transmission.

In some embodiments, the mobile edge node 301 may receive the analytical model 317 and the accompanying logic 327 from the external server 303. The external server 303 produces the analytical model 317 and accompanying logic 327 using machine learning algorithms performed by the one or more processors 331, which executes machine learning instructions 335. For example, the one or more processors 331 may perform crowd-sourced learning, federated learning, or other machine learning algorithms and techniques to produce the analytical model 317. The one or more processors 331 produce the analytical model 317 using the received situational context from multiple mobile edge nodes 301 as inputs to the machine learning algorithms. Also, the one or more processors 331 may use information gathered from training information gathered during pre-operational phases of the mobile edge nodes 301 and other operations performed by other systems (not shown) that gather training data related to the operation of the mobile edge nodes 301.

In further embodiments, the external server 303 may also implement various analytical techniques of the situational context to prepare the data for input as training data for the machine learning algorithms. For example, the one or more processors 331 may perform a principal component analysis of data associated with different components on the mobile edge nodes 301, averaging of situational context, histograms for various parameters, Markov models, clustering over different mathematical selections, Kalman filtering, edge detection, and other statistical processes for preparing data for processing by a machine learning algorithm.

In additional embodiments, the external server 303 stores multiple analytical models 339 on the memory 333. The multiple analytical models 339 may apply to different types of mobile edge nodes 301, to different regions of operation for the mobile edge nodes 301, or for different situations as indicated by situation information 319. Accordingly, in addition to using the received situational context from the multiple mobile edge nodes 301 to create new analytical models, the one or more processors 331 may identify additional analytical models to transmit to a particular mobile edge node 301 based on the situational context received from that particular mobile edge node 301.

In certain embodiments, a mobile edge node 301 may store a list of components 325 in the memory 311. The list of components 325 may be a record of the components 329 that currently execute or operate on the mobile edge node 301. Similarly, the external server 303 may store an index of available components 337 on the memory 333. The index of available components 337 may be a record of components that may operate or be executed on one or more mobile edge nodes 301. Accordingly, a mobile edge node 301 may transmit information from the list of components 325 to the external server 303. The external server 303 may use the received information from the list of components 325 to synchronize the list of components 325 with the index of available components 337. Also, the external server 303 may associate the components listed in the index of available components 337 with potential situational context that could arise during the operation of one of the mobile edge nodes 301.

In exemplary embodiments, during the operation of the mobile edge node 301, the one or more processors 307 may perform a device discovery process. During the device discovery process, the one or more processors 307 may store information describing a local context 323 for the mobile edge node 301. As described herein, the local context 323 includes information that describes the currently operating components 329 and information indicating newly discovered components. The one or more processors 307 may then transmit the local context 323 to the external server 303 as part of a request for additional analytical models. When the external server 303 receives the request, the one or more processors 331 identify component information based on the local context. For example, the one or more processors 331 may identify information in the index of available components 337 associated with the components identified in the received local context for the mobile edge node 301. The external server 303 may then transmit the component information associated with components identified in the local context to the mobile edge node 301. Upon receiving the component information, the mobile edge node 301 may load the component information to support the operation of discovered components 329.

In additional embodiments, one or more processors 307 may execute command-and-control applications 321. The command-and-control applications 321 may control the operation of the various components 329 on the mobile edge node 301. As part of controlling the operation of the components 329, the command-and-control applications 321 may gather information related to the execution of the analytical model 317 as model-related data. The one or more processors 307 may transmit the gathered model-related data to the external server 303, where the external server 303 uses the model-related data for building or adjusting one or more of the analytical models 339 stored on the memory 333.

The one or more processors 307 and 331 or other computational devices used in the network 300, or other systems and methods described herein, may be implemented using software, firmware, hardware, or appropriate combinations thereof. In some implementations, a single processor may execute the functionality of any combination of the one or more processors 307 or the one or more processors 331. Alternatively, the functions of the one or more processors 307 and 331 may be performed by multiple processors. The one or more processors 307 and 331 or other computational devices may be supplemented by, or incorporated in, specially designed application-specific integrated circuits (ASICs) or field programmable gate arrays (FPGAs). In some implementations, the one or more processors 307 and 331 or other computational devices may communicate through an additional transceiver with other computing devices not shown in the network 300. The one or more processors 307 and 331 and other computational devices can also include or function with software programs, firmware, or other computer-readable instructions for carrying out various process tasks, calculations, and control functions used in the methods and systems described herein.

The methods described herein may be implemented by computer-executable instructions, such as program modules or components, which are executed by at least one processor, such as the one or more processors 307 and 331. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable instructions. These instructions are typically stored on appropriate computer program products that include computer-readable media used to store computer-readable instructions or data structures. Such a computer-readable medium may be available media that can be accessed by a general-purpose or special-purpose computer or processor, or any programmable logic device. For instance, the memory 311 and the memory 333 may be an example of a computer-readable medium capable of storing computer-readable instructions and/or data structures. The memory 311 and the memory 333 may also store navigation information such as maps, terrain databases, magnetic field information, path data, and other navigation information.

Suitable computer-readable storage media (such as the memory 311 and the memory 333) may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

Figure 4:
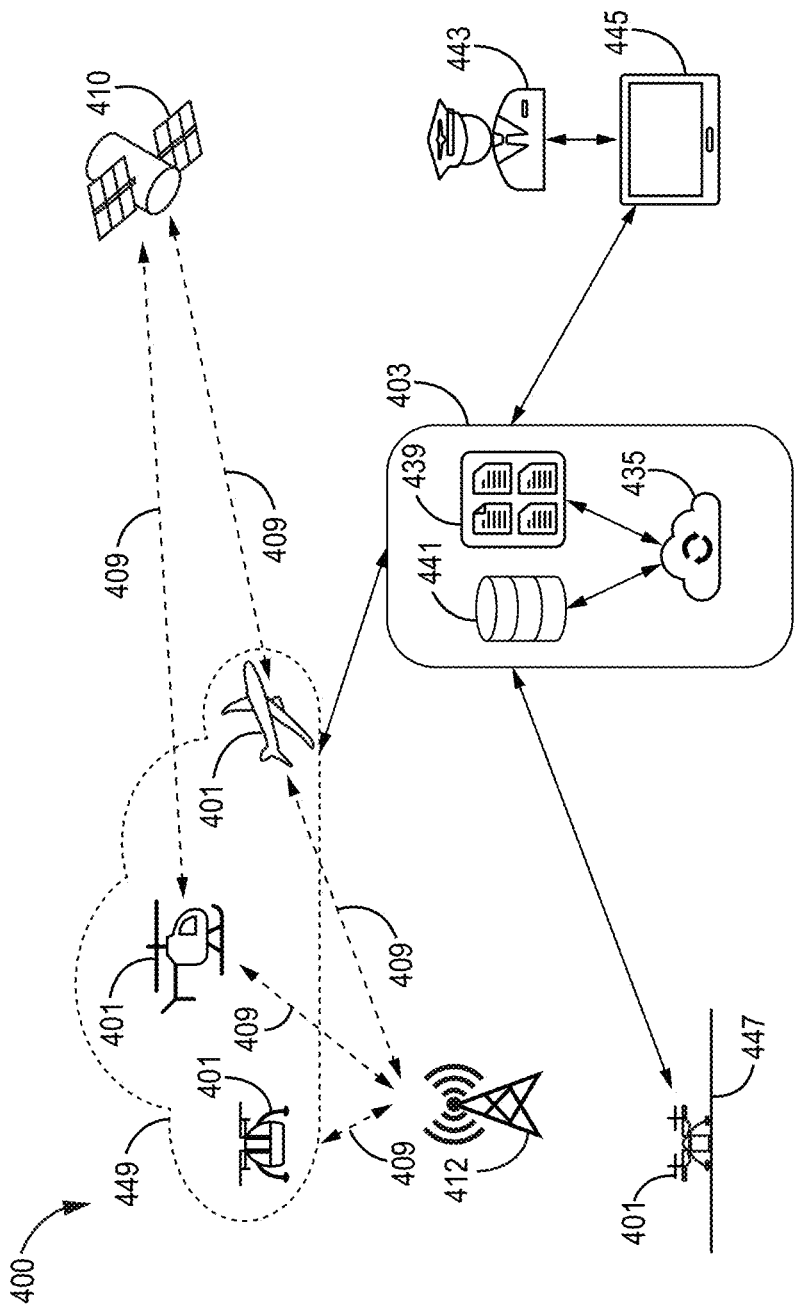
FIG. 4 is a diagram illustrating a system architecture for providing a situation aware edge analytics framework for communication systems according to an aspect of the present disclosure.

FIG. 4 is a diagram illustrating the network 300 as a network 400, where the network 400 provides a situation aware analytic framework for aircraft to predict the availability and states of communication systems. For example, the network 400 includes multiple mobile edge nodes 401, where the multiple mobile edge nodes 401 are individual aircraft that communicate through one or more communication links 409 with ground-based communication systems 412 and aerial-based communication systems 410. As shown, the mobile edge nodes 401, communication links 409, aerial-based communication systems 410, and ground-based communication system 412 respectively function similar to the mobile edge nodes 301, and communication links 309 in FIG. 3 and the ground communication system 207 and aerial-based communication system 209 in FIG. 2.

The multiple mobile edge nodes 401 communicate with an external server 403. The external server 403 may also be referred to as a cloud server and may comprise multiple devices that perform the functionality ascribed to the external server 303. For example, the external server 403 may include storage for multiple analytical models 439 in a fashion similar to the multiple analytical models 339 in FIG. 3. Also, the external server 403 may include a data lake 441, which stores information received from the multiple mobile edge nodes 401 such as the situational context, list of components, and other information received from the multiple mobile edge nodes 401. The external server 403 may receive the information from the multiple mobile edge nodes 401 through the one or more communication links 409 or through a dedicated communication link for communications between the external server 403 and the multiple mobile edge nodes 401. The information may include data that may aid the external server 403 to generate efficient analytical models. Examples of the information acquired from the multiple mobile edge nodes 401 and stored in the data lake 441 may include latitude, longitude, heading, and altitude of the multiple mobile edge nodes 401. The information may also include contextual weather details, operational flight plans, flight corridor plans, datalink signal strength, lists of components on multiple mobile edge nodes 401, and the like.

In certain embodiments, the external server 403 may include processors that execute machine learning instructions 435 to process the information in the data lake 441 to create the multiple analytical models 439. While the external server 403 is shown as a single entity, the external server 403 may include multiple devices that function together to perform the machine learning algorithms in a federated manner. For example, the multiple analytical models 439 may be stored on a storage device, the data lake 441 may be stored on a different storage device, and the machine learning instructions 435 may be performed by multiple processors that perform portions of the machine learning algorithms.

In some embodiments, the external server 403 may provide one or more analytical models to multiple mobile edge nodes 401 during a pre-operation phase 447, where the multiple mobile edge nodes 401 use the analytical models to predict communication link states for the one or more communication links 409 during an operational phase 449. Additionally, the external server 403 may provide information to support installing components on the multiple mobile edge nodes 401 during the pre-operation phase 447. During the operational phase 449, the multiple mobile edge nodes 401 use the analytical models to predict communication link states to reduce connectivity downtime and latency. Also, during the operational phase 449, the multiple mobile edge nodes 401 transmit information as described above to the external server 403 to refine the models stored in the multiple analytical models 439. Alternatively, the multiple mobile edge nodes 401 may store the information for transmission to the external server 403 during a later post-operation phase, or a later pre-operation phase 447 for future operational phases.

In additional embodiments, the external server 403 may transmit additional analytical models to the multiple mobile edge nodes 401 during the operational phase 449. For example, the external server 403 may analyze the information from the multiple mobile edge nodes 401 and, if the external server 403 determines that a new analytical model should be sent based on the received information, the external server 403 may send an additional analytical model to the multiple mobile edge nodes 401. Also, the software executing on the multiple mobile edge nodes 401 may determine that an additional analytical model is needed based on the situational context provided by the analytical model executing on the multiple mobile edge nodes 401. Accordingly, a mobile edge node 401 may transmit a request for an additional analytical model to the external server 403. The request may include situational context that the external server 403 uses to identify the appropriate analytical model in the multiple analytical models 439. The external server 403 may then transmit the identified additional analytical model. Thus, the multiple mobile edge nodes 401 may execute an analytical model that efficiently predicts the states of the one or more communication links 409.

In certain embodiments, an operator 443 may provide additional data to the external server 403 through a human-machine interface 445. The additional data may account for potential blind spots that may arise during the creation of the analytical models or for data and situational context that may arise but is not accounted for in data stored in the data lake 441. The machine learning instructions 435 may use the additional data when creating analytical models. Also, the operator 443 may provide policy rules through the human-machine interface 445. The machine learning instructions 435 may also create a policy model that applies to predictions from the created analytical models.

Figure 5:
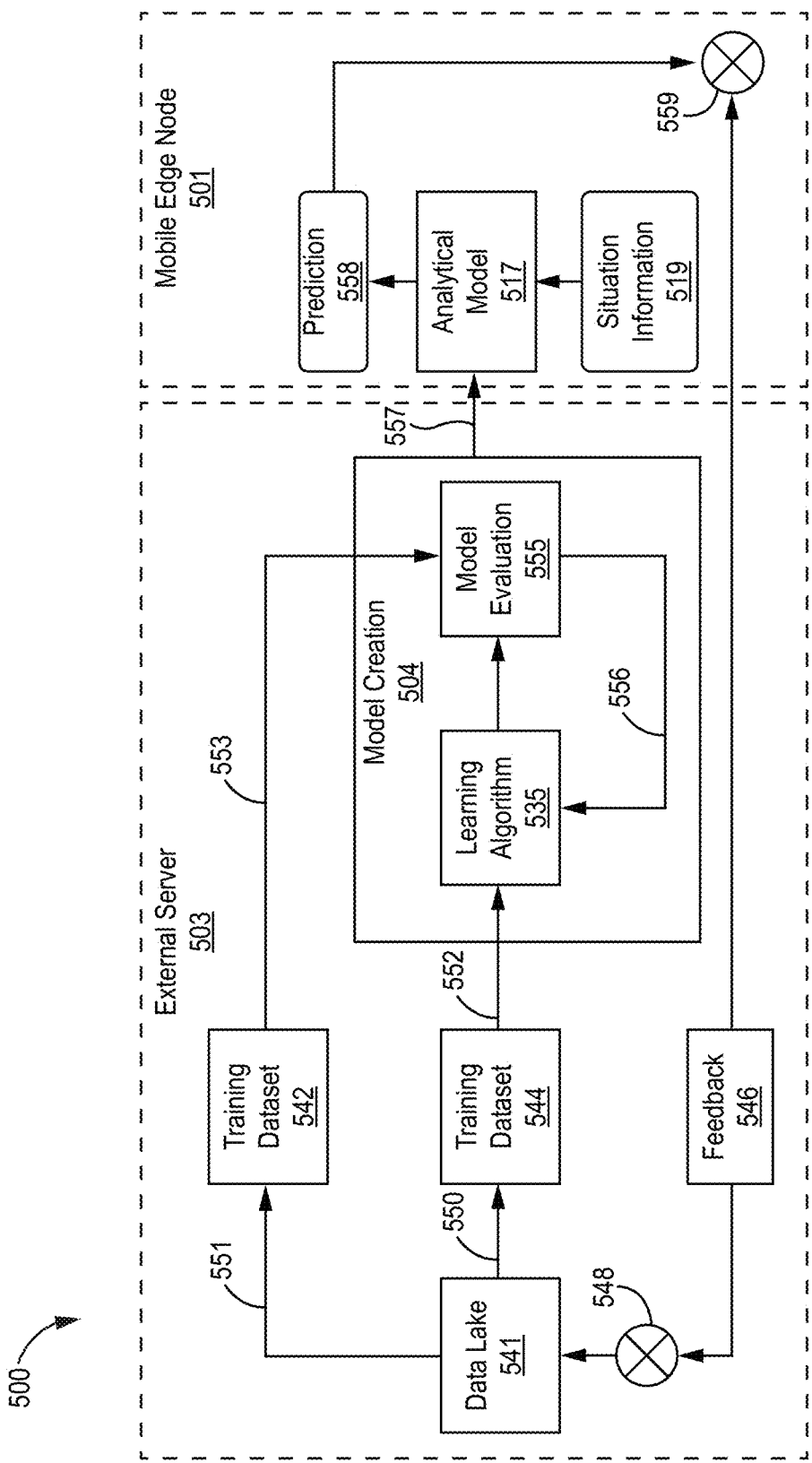
FIG. 5 is a block diagram illustrating the deployment of systems for providing a situation aware edge analytics framework for communication systems according to an aspect of the present disclosure.

FIG. 5 is a block diagram illustrating a process 500 for updating the analytical models 517 for use by the mobile edge nodes 501 to predict the availability and states of the communication links. As illustrated, the process 500 shows the tasks performed by an external server 503 and a mobile edge node 501. The external server 503 and the mobile edge nodes 501 may perform similarly to the external servers and mobile edge nodes described above in connection with FIGS. 3 and 4.

To update the analytical models, the external server 503 stores data from multiple edge nodes 501 in a data lake 541. With data stored in the data lake 541, the process 500 proceeds at 550, where the external server 503 acquires a training dataset 544 from the data lake 541. Also, the process proceeds at 551, where the external server acquires a testing dataset 542 from the data lake 541. The training dataset 544 is used as an input to a learning algorithm 535 and the testing dataset 542 is used to determine the accuracy of the model produced by the learning algorithm 535. In some implementations, the size of the testing dataset 542 is significantly greater than the size of the training dataset 544.

When the external server 503 acquires the training dataset 544 and the testing dataset 542 from the data lake 541, the process 500 proceeds at 552, where the training dataset 544 is provided as an input to a model creation block 504. Also, the process 500 may proceed at 553, where the testing dataset 542 is provided as an input to the model creation block 504. The model creation block 504 creates an analytical model from the training dataset 544 and tests the output of prospective models against data in the testing dataset 542. For example, the model creation block 504 includes at least two operative blocks, the learning algorithm 535 and the model evaluation 555.

In some embodiments, the learning algorithm 535 may receive the training dataset 544 as an input and calculate an analytical model. The learning algorithm 535 may be a decision tree, a type of neural network, or other type of algorithm suitable for creating an analytical model for the training dataset 544. The learning algorithm 535 provides a prospective analytical model to the model evaluation 555. The model evaluation 555 tests the prospective analytical model against the testing dataset 542. If the prospective analytical model fails to model the data in the testing dataset 542 within a defined performance metric, the process 500 proceeds at 556, where the model evaluation 555 provides model adjustments to the learning algorithm 535. When the learning algorithm 535 receives the model adjustments, the learning algorithm 535 may adjust the prospective analytical model to more closely match the data in the testing dataset 542. The model evaluation 555 may then reevaluate the revised analytical model. The learning algorithm 535 and the model evaluation iteratively create prospective analytical models, evaluate the analytical models and then adjust the created analytical models until the model evaluation 555 evaluates a model having the desired performance, within a preset tolerance level, in relation to the testing dataset 542.

In exemplary embodiments, when the model creation block 504 produces a model having the desired performance, the external server 503 may store the model in model storage (such as the multiple analytical models 439 in FIG. 4). During operation, the mobile edge node 501 may send a request to the external server 503 for an analytical model. When the external server 503 receives a request for an analytical model from the the mobile edge node 501, the process 500 proceeds at 557, where an analytical model is provided to the mobile edge node 501 based on the request. Each mobile edge node 501 that receives the analytical model may store the analytical model in memory located on the mobile edge node 501.

In certain embodiments, on the mobile edge node 501, the analytical model 517 may receive situational information 519 as an input from various components (both software and hardware) on the mobile edge node 501. The analytical model 517 then provides predictions 558 for communication link states as an output. The mobile edge node 501 may use the predictions 558 to connect to various communication links to reduce connectivity downtime and latency. Additionally, the 517 may provide the predictions 558 to the external server 503 as feedback 546. Specifically, the mobile edge node 501 may modulate 559 a signal having the predictions 558 and situational context associated with the predictions 558 for transmission to the external server 503. The external server 503 may receive the transmission and demodulate 548 the transmission. The external server 503 may then store the predictions 558 and situational context in the data lake 541 for the creation and evaluation of additional analytical models.

Figure 6:
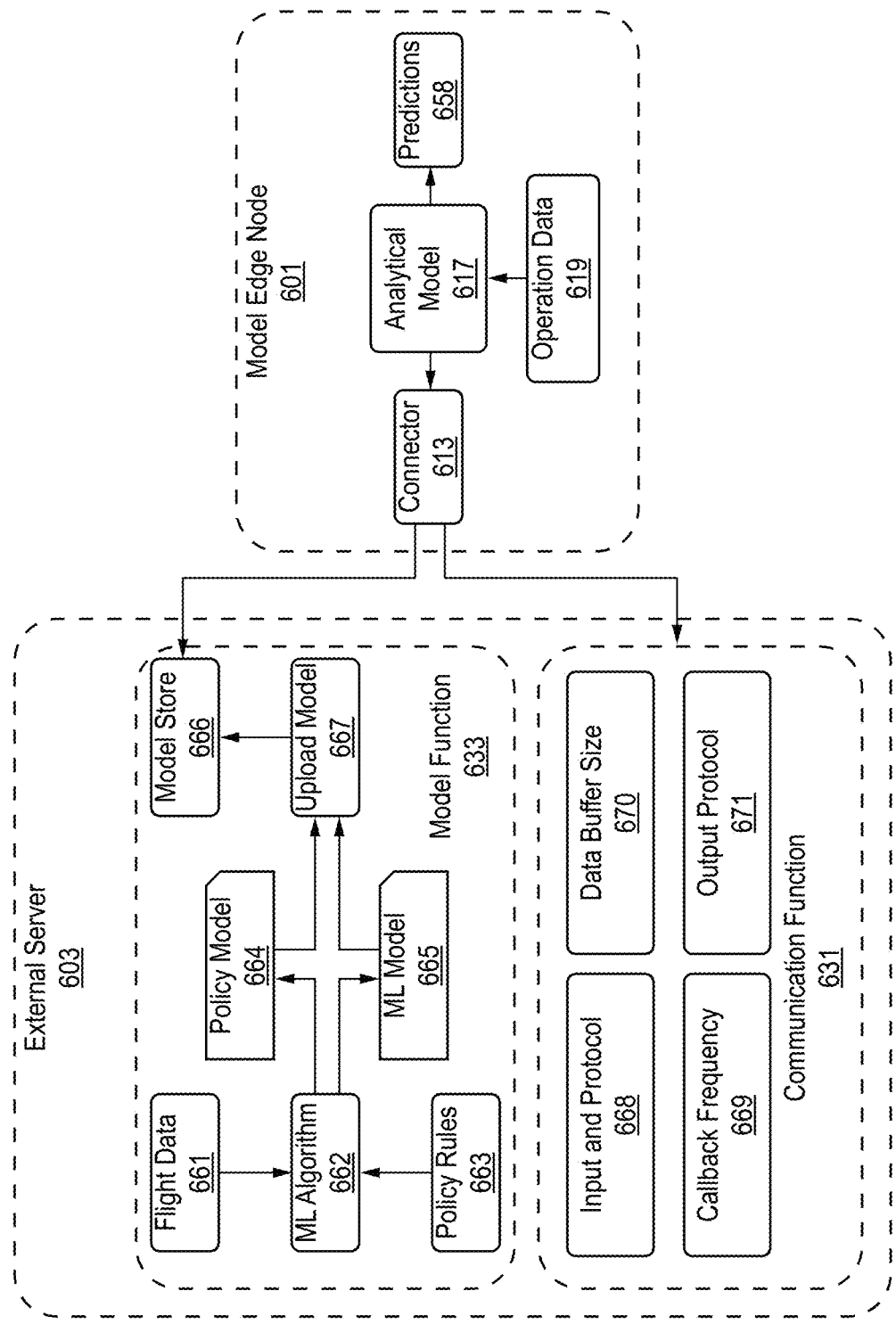
FIG. 6 is a block diagram illustrating software modules for providing a situation aware edge analytics framework for communication systems according to an aspect of the present disclosure.

FIG. 6 is a block diagram illustrating software modules of an external server 603 in an analytical framework that provides situation awareness of edge nodes in communication systems that facilitate the creation of analytical models by the external server 603 for predicting the availability and states of communication links. As illustrated, modules can be executed or stored on either an external server 603 or a mobile edge node 601. The external server 603 and the mobile edge node 601 may include the functionality described above (for example, as the external server 303 or the mobile edge node 301). Additionally, the software modules on the external server 603 may be grouped into at least two sets of modules, a model function 633 and a communication function 631. The model function 633 includes software modules for analyzing data and creating analytical models for use by mobile edge nodes 601, and the communication function 631 includes software module to facilitate communications with one or more mobile edge nodes 601.

In certain embodiments, the communication function 631 may include an input and protocol module 668, a callback frequency module 669, a data buffer size module 670, and an output protocol module 671. The communication function 631 may include other software modules as well. As used herein, the input and protocol module 668 provides software support for receiving messages from multiple mobile edge nodes 601. For example, the input and protocol module 668 may implement the message queuing telemetry transport (MQTT) protocol to support receiving messages from the mobile edge node 601. As such, the input and protocol module 668 may define the format for received messages according to other protocols. Further, the input and protocol module 668 may determine where to store received data from a mobile edge node 601. The output protocol module 671 supports transmitting messages to one or more mobile edge nodes 601. For example, the output protocol module 671 may also implement the MQTT protocol or other suitable communication protocol. Further, the output protocol module 671 may also define what data to transmit to the mobile edge nodes 601.

In exemplary embodiments, the callback frequency module 669 may define when to initiate transmissions to the one or more mobile edge nodes 601. For example, the callback frequency module 669 may periodically transmit model or component information to the one or more mobile edge nodes 601 or transmit data when requested from the mobile edge node 601. Further, the data buffer size module 670 may define the amount of memory available for storing both received data from the one or more mobile edge nodes 601 and data to be sent to the one or more mobile edge nodes 601. In some implementations, the data buffer size module 670 may define different buffer sizes for different mobile edge nodes 601 and define dedicated memory space for communicating with the different mobile edge nodes 601.

In some embodiments, the model function 633 includes a flight data module 661, a machine learning (ML) algorithm module 662, a policy rules module 663, an upload model module 667, and a model store module 666. Further, the model function 633 may generate a policy model 664 and an ML model 665 for use by the mobile edge node 601. For example, the communication function 631 may provide information from the one or more mobile edge nodes 601 to the model function 633. The model function 633 may store and process the received data using the flight data module 661. The flight data module 661 may identify flight data from a mobile edge node 601. While referred to as flight data, the data may also be referred to as operation data generally, particularly for mobile edge nodes that are not aircraft. The identified data may include situational context, local context, and other information related to the operation of the one or more mobile edge nodes 601. Also, the flight data module 661 may acquire information about the operation of the one or more mobile edge nodes 601 from other sources like a service provider, airlines operation center, and the like.

In certain embodiments, the policy rules module 663 may define the policy rules that control the operation of the mobile edge node 601. For example, the policy rules may define rules for operating one or more mobile edge nodes 601 in a UAM corridor, a UTM environment, or a particular airspace class. The flight data module 661 and the policy rules module 663 may provide the associated information to the ML algorithm module 662. The ML algorithm module may then use machine learning algorithms, as described above, to generate a policy model 664 and an ML model 665. The policy model 664 provides information for selecting a communication link based on communication policies, and the ML model 665 provides information for selecting a communication link based on the status of the communication link and situational information. An upload model module 667 then uploads the model into a format where the models can be readily transmitted to one or more mobile edge nodes 601 and provides the models to a model store module 666. The model store module 666 stores the models in memory for subsequent transmission to one or more mobile edge nodes 601.

In exemplary embodiments, a mobile edge node 601 includes modules for communicating with the external server 603. For example, the mobile edge node 601 may include a connector module 613. The connector module 613 may receive analytical models from the 633 and use them as an analytical model 617. The analytical model 617 works sufficiently similar to the analytical model 317 in FIG. 3 in that the analytical model 617 receives operation data 619, which is similar to the situation information 319 and generates predictions 658 from the operation data 619, where the predictions 658 are similar to the predictions 558 described above in FIG. 5. The connector module 613 may also facilitate the transmission of predictions 658 and other output from the analytical model 617 to the external server 603.

Figure 7:
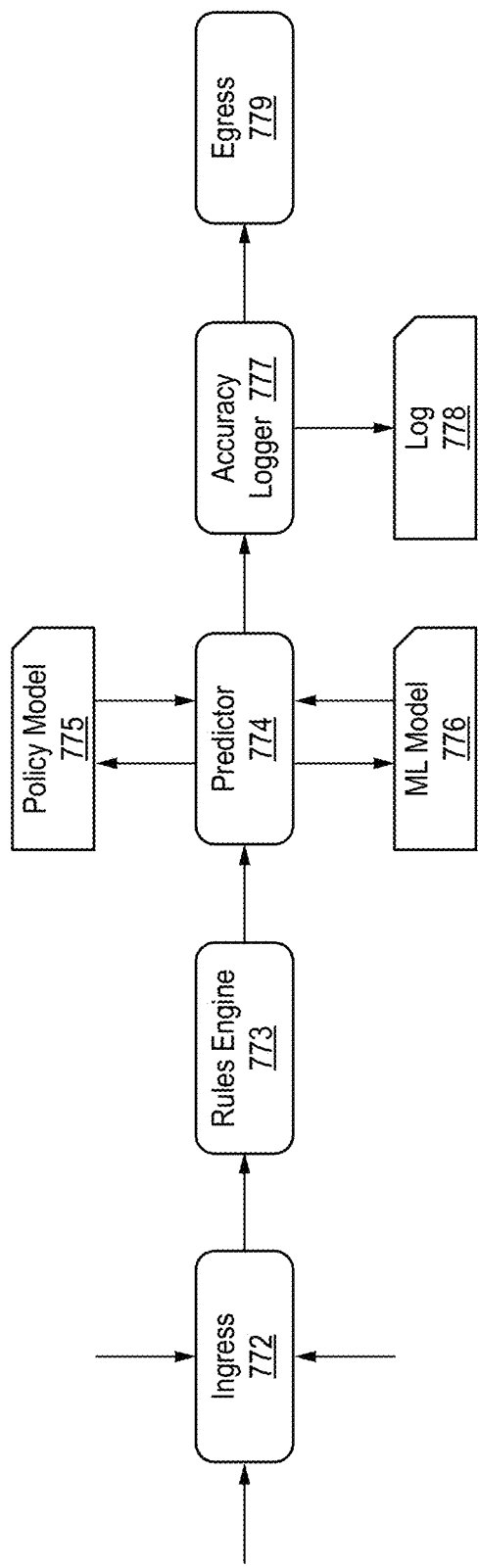
FIG. 7 is a block diagram illustrating software modules within a mobile edge node according to an aspect of the present disclosure.

FIG. 7 is a block diagram illustrating software modules of a mobile edge node in an analytical framework that provides situation awareness for edge nodes in communication systems to predict the availability and states of communication links in the communication systems. As illustrated, the mobile edge node may include an ingress module 772. The ingress module 772 may receive information from multiple sources on a mobile edge node. For example, the ingress module 772 may receive information about the current state of the mobile edge node. Also, the ingress module 772 may receive information about the future state of the mobile edge node at a specific time in the future. Also, the ingress module 772 may receive information regarding the current status of the various communication links through which the mobile edge node may communicate. For example, the ingress module 772 may receive the current status of 5G, LTE, SATCOM, VHF, and other communication links. In other words, the ingress module 772 receives situation information from the operating components on the mobile edge node. The ingress module 772 then provides the received measurements to a rules engine 773.

Figure 8:
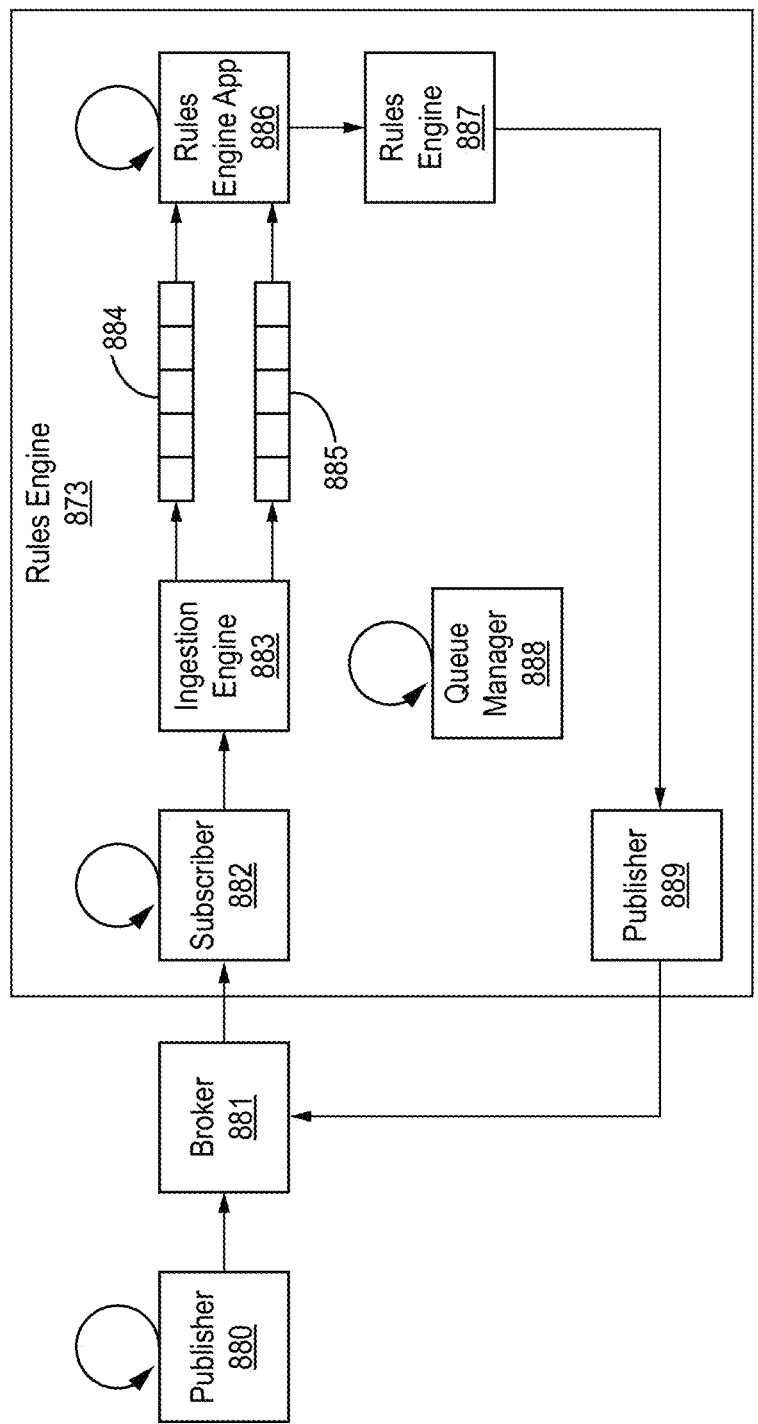
FIG. 8 is a block diagram illustrating a rules engine within a situation aware edge analytics framework for communication systems according to an aspect of the present disclosure.

Regarding the rules engine 773, FIG. 8 is a block diagram illustrating the operation of a rules engine 873, such as the rules engine 773. In providing the data to the rules engine, the ingress module 772 may include a publisher 880. The publisher 880 may provide messaging protocols such as MQTT, AMQP, CoAP, or other similar protocols for providing information to the rules engine 873. The publisher 880 periodically checks to see if data is available from the ingress module 772 and publishes the received data for use by other components, and provides the data to a broker 881. The broker 881 receives the published data according to the message topics and broadcasts the data to any sub scribers.

In certain embodiments, the rules engine 873 includes a subscriber 882 that subscribes to the data broadcast from the broker 881. The subscriber 882 periodically checks to see if data is available from the subscriber 882. When data is available from the broker 881, the subscriber 882 provides the data to an ingestion engine 883. The ingestion engine 883 converts the data and pushes the data onto one of two streams, a stream queue 884 and a command queue 885. The stream queue 884 includes data produced by the mobile edge node components. The command queue 885 includes commands configured by the external server. As illustrated, the rules engine 873 includes a queue manager 888. The queue manager 888 manages the data in the stream queue 884 and the command queue 885.

In exemplary embodiments, the rules engine 873 includes a rules engine app 886. The rules engine app 886 checks the stream queue 884 and the command queue for data and provides data from the stream queue 884 and the command queue 885 to the rules engine 887. The rules engine 887 processes the rules configured in the external server as received in the command queue 885 and evaluates the stream queue 884 with expressions constructed from the commands in the command queue 885. The rules engine 887 then provides the evaluated data to a publisher 889, which provides the evaluated data from the rules engine 887 to the broker 881. The broker 881 may then provide the evaluated data to additional modules in the mobile edge node.

In certain embodiments, the rules engine 887 evaluates the mathematical rules provided by the external server against live data received by the components of the mobile edge node. In some implementations, the rules engine 887 may define a software development kit that establishes a wrapper around standard expression engines and integrates this capability within the end-to-end architecture presented by the external server and the mobile edge node. The use of an SDK and the rules engine may be implemented with a plug-and-play architecture to support the attachment and detachment of components with a small resource footprint.

In further implementations, the rules applied by the rules engine 887 may be configured in various ways within the external server. For example, the external server may have a GUI-based configuration that allows the selection of pre-defined aggregations of data potentially found in the stream queue 884. Also, the external server may provide a script-based language that permits the defining of states, expressions, conditions, and thresholds for comparison against the data in the stream queue 884. An operator similarly may perform the configuration of the rules to the operator 443 in FIG. 4.

In some embodiments, the rules configured on the external server may be pushed to the mobile edge node during runtime. Alternatively, the rules may be pushed to the mobile edge node when the mobile edge node boots or connects through a communication link with the external server. The rules engine 887 then processes the data in the stream queue 884 against the rules at either periodic intervals or as the data arrives at the rules engine 887. The rules engine 887 may raise events or alarms when the data in the stream queue 884 satisfies various conditions defined in the rules. The raised alarms and events are then provided as an output from the rules engine 887.

Returning to FIG. 7, the rules engine 773 may provide the raised alarms and events to a predictor 774. Also, the predictor 774 may receive data from the various components on the mobile edge node. For example, the rules engine 773 may store the raised alarms, events, and data in a buffer, where the predictor 774 acquires and processes a set amount of information from the buffer. Alternatively, the predictor 774 may acquire data that has been stored in the buffer over a set amount of time. The predictor 774 may process the data and use an ML model 776 and a policy model 775 to predict the future states of communication links that the mobile edge node can potentially use for communications. For example, the predictor 774 provides the data received from the rules engine 773 to the ML model 776. The ML model 776 then predicts the future states of the potential communication links. The predictor 774 then provides the predictions to the policy model 775, which determines which link to use by applying defined policies to the predictions. The predictor 774 then provides the predicted link, predicted link states, and the received data as an output.

In additional embodiments, the mobile edge node includes an accuracy logger 777. The Accuracy logger 777 may receive the output of the predictor 774 and determine the accuracy of the predictions. To determine the accuracy of the predictions, the accuracy logger 777 compares the actual status of the communication link at the time associated with the predicted communication link against the prediction. The accuracy logger 777 then stores the comparison results and situational context for the comparison in a log 778. The mobile edge node then provides the data in the log 778 to the external server at the end of an operational phase (like a flight) or during the operational phase. The external server can then use the data in the logger to refine future versions of the ML model 776 and the policy model 775. While the accuracy logger 777 is performing the comparison, the predicted state is provided to egress 779, which then provides the prediction to components within the mobile edge node for configuring communication links based on the prediction.

Figure 9:
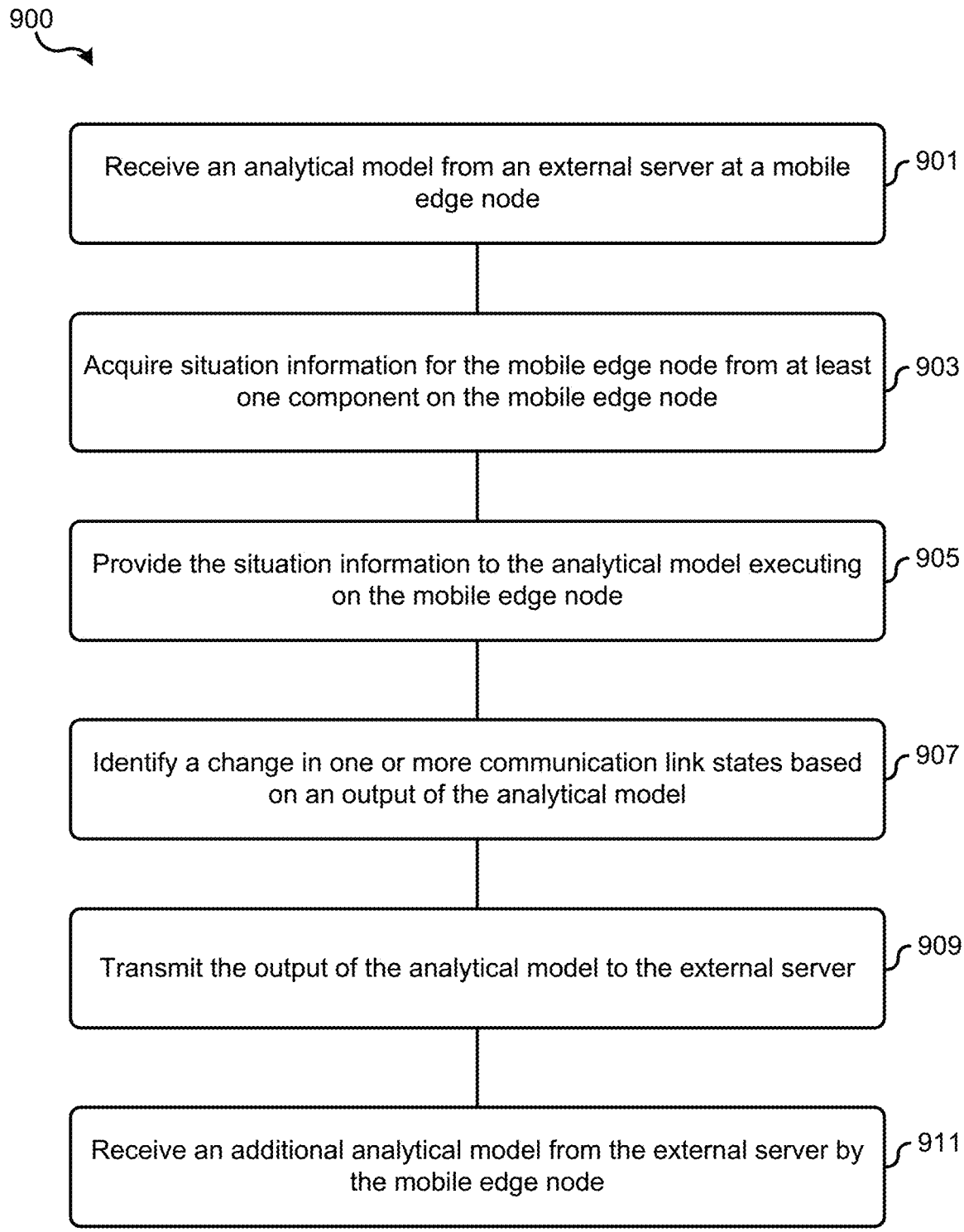
FIG. 9 is a flowchart diagram illustrating a method for providing a situation aware edge analytics framework for communication systems according to an aspect of the present disclosure.

FIG. 9 depicts a flow diagram illustrating an exemplary method 900 for a situation aware edge analytics framework for communication systems. The method 900 may be implemented via the techniques described with respect to FIGS. 3-8, but may be implemented using other techniques known to one having skill in the art. The blocks of the flow diagram have been arranged in a generally sequential manner to facilitate explanation. But, the arrangement of the blocks is merely exemplary, and the blocks can be arranged in any manner sufficient to provide the functionality described above with respect to FIGS. 3-8. For example, the processing associated with the methods described herein (and the blocks shown in the Figures) may occur in a different order (i.e., where at least some of the processing associated with the blocks is performed in parallel, in an event-driven manner, or both).

In certain embodiments, the method 900 proceeds at 901, where an analytical model is received from an external server at a mobile edge node. For example, a mobile edge node may receive an analytical model during a pre-operation or operation phase from the external server. The method 900 then proceeds at 903, where situation information is acquired for the mobile edge node from at least one component on the mobile edge node. For example, sensors may acquire measurements about the environment of the mobile edge node and the movement of the mobile edge node. Also, the components may monitor the status of the various communication links supported by the components of the mobile edge node.

In further embodiments, the method 900 proceeds at 905, where the situation information is provided to the analytical model executing on the mobile edge node. For example, the analytical model receives the situation information as an input to a model that predicts the state of the communication links supported by the mobile edge node. Moreover, the method 900 proceeds at 907, where a change in one or more communication link states is identified based on an output of the analytical model. For example, the output of the analytical model provides predictions for the future state of the communication links supported by the mobile edge node. Changes in the communication link states may indicate that the mobile edge node should change the communication channel through the one or more communication links.

In additional embodiments, the method 900 proceeds at 909, where the output of the analytical model is transmitted to the external server. For example, the mobile edge node may transmit situational context, predictions, and other information produced by the analytical model to the external server. The external server may use the output information to refine the analytical models stored on the external server. Further, the method 900 proceeds at 911, where an additional analytical model is received from the external server by the mobile edge node. For example, as the external server used the output from the analytical model to refine analytical models stored on the external server, the external server may transmit one of these refined additional analytical models to the mobile edge node to improve the performance of the analytical model on the mobile edge node.

Example Embodiments

Example 1 includes a method comprising: receiving an analytical model from an external server at a mobile edge node; acquiring situation information for the mobile edge node from at least one component on the mobile edge node; providing the situation information to the analytical model executing on the mobile edge node; identifying a change in one or more communication link states based on an output of the analytical model; transmitting the output of the analytical model to the external server; and receiving an additional analytical model from the external server by the mobile edge node, where the additional analytical model is based on the output of the analytical model.

Example 2 includes the method of Example 1, wherein the analytical model comprises logic to derive situational context of the change in the one or more communication link states from the situation information, the logic presenting the situational context in a communicable form, wherein the situational context is part of the output transmitted to the external server.

Example 3 includes the method of Example 2, wherein the external server identifies the logic to derive the situational context, wherein the external server identifies the logic by: deriving operation data for the mobile edge node from the situational context; creating a model for the operation data using machine learning; and evaluating a model output against a testing dataset.

Example 4 includes the method of Example 3, wherein the logic expresses the operation data in tuples that include local context, mobile edge node state parameters, and communication link parameters.

Example 5 includes the method of any of Examples 3-4, further comprising: storing a list of components present in the mobile edge node; transmitting the list of components to the external server; synchronizing the list of components with an index of available components; and associating the index of the available components with potential situational context for the mobile edge node.

Example 6 includes the method of any of Examples 3-5, further comprising: performing device discovery at the mobile edge node; building a local context based on the device discovery; requesting one or more analytical models from the external server, wherein the request comprises the local context; identifying component information at the external server based on the request; transmitting the component information to the mobile edge node; and loading one or more components at the mobile edge node based on the component information.

Example 7 includes the method of any of Examples 2-6, wherein receiving the additional analytical model from the external server to the mobile edge node comprises acquiring the additional analytical model based on the situational context, wherein the external server identifies the additional analytical model from the situational context.

Example 8 includes the method of any of Examples 1-7, wherein the external server creates the additional analytical model information using at least one of: principal component analysis; averaging; single parameter histograms; Markov models; Kalman filtering, edge detection, and clustering over a mathematical selection.

Example 9 includes the method of any of Examples 1-8, wherein identifying the change in the one or more communication link states based on the output of the analytical model uses one or more regular expressions to represent the change in the one or more communication link states.

Example 10 includes the method of any of Examples 1-9, further comprising: executing at least one of commands and control applications, wherein the commands and the control applications gather model-related data on the mobile edge node; transmitting the model-related data to the external server; and building the analytical model on the external server.

Example 11 includes a system comprising: one or more components on a mobile edge node; one or more memories within the mobile edge node; one or more transceivers for transmitting and receiving communications for the mobile edge node; and one or more processors configured to execute instructions that cause the one or more processors to: receive an analytical model from an external server through the one or more transceivers; store the analytical model in the one or more memories; receive situation information for the mobile edge node from the one or more components on the mobile edge node; and using the analytical model to identify a change in one or more communication link states based on the situation information.

Example 12 includes the system of Example 11, wherein using the analytical model comprises applying a plurality of policies to the one or more communication link states.

Example 13 includes the system of Example 12, wherein the analytical model defines a software development kit for supporting plug-and-play of additional components.

Example 14 includes the system of any of Examples 11-13, wherein the one or more processors stores information as tuples related to local context, mobile edge node state parameters, and communication link parameters.

Example 15 includes the system of any of Examples 11-14, wherein the one or more processors execute the instructions that direct the one or more processors to select an additional analytical model using at least one of: a principal component analysis; averaging; single parameter histograms; Markov models; Kalman filtering, edge detection, and clustering over a mathematical selection.

Example 16 includes a system comprising: one or more memories within an external server; one or more transceivers for communicating with a plurality of mobile edge nodes; and one or more processors coupled to the one or more transceivers and the one or more memories configured to execute instructions that cause the one or more processors to: collect operation data from the plurality of mobile edge nodes received by the one or more transceivers; train an analytical model based on the operation data, wherein the analytical model is trained to identify changes in one or more communication link states on a mobile edge node in the plurality of mobile edge nodes based on situation information acquired by the mobile edge node; and transmit the analytical model to the plurality of mobile edge nodes.

Example 17 includes the system of Example 16, wherein the one or more processors performs a model function, wherein the model function generates the analytical model, where the analytical model comprises a machine learning model and a policy model based on the operation data.

Example 18 includes the system of Example 17, wherein the model function generates the analytical model based on the operation data and policy rules for the operation of the mobile edge node.

Example 19 includes the system of any of Examples 16-18, wherein the one or more processors performs a communication function, wherein the communication function controls a transmission of the analytical model to at least one mobile edge node in the plurality of mobile edge nodes.

Example 20 includes the system of Example 19, wherein the communication function directs the transmission of the analytical model to the at least one mobile edge node at least: in response to a request from the at least one mobile edge node; or periodically based on settings configured by the communication function.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
    receiving an analytical model from an external server at a mobile edge node;
    acquiring situation information for the mobile edge node from at least one component on the mobile edge node, wherein the situation information describes at least one of:
        position of the mobile edge node;
        motion of the mobile edge node;
        travel plans of the mobile edge node; and
        current performance of one or more available communication links;
    providing the situation information to the analytical model executing on the mobile edge node, wherein the analytical model generates an output based on the situation information, wherein the output predicts the availability of the one or more available communication links;
    identifying a change in one or more communication link states for the one or more available communication links based on an output of the analytical model;
    transmitting the output of the analytical model to the external server; and
    receiving an additional analytical model from the external server by the mobile edge node, where the additional analytical model is based on the output of the analytical model.

2. The method of claim 1, wherein the analytical model comprises logic to derive situational context of the change in the one or more communication link states from the situation information, the logic presenting the situational context in a communicable form, wherein the situational context is part of the output transmitted to the external server.

3. The method of claim 2, wherein the external server identifies the logic to derive the situational context, wherein the external server identifies the logic by:
    deriving operation data for the mobile edge node from the situational context;
    creating a model for the operation data using machine learning; and
    evaluating a model output against a testing dataset.

4. The method of claim 3, wherein the logic expresses the operation data in tuples that include local context, mobile edge node state parameters, and communication link parameters.

5. The method of claim 3, further comprising:
    storing a list of components present in the mobile edge node;
    transmitting the list of components to the external server;
    synchronizing the list of components with an index of available components; and
    associating the index of the available components with potential situational context for the mobile edge node.

6. The method of claim 3, further comprising:
    performing device discovery at the mobile edge node;
    building a local context based on the device discovery;
    requesting one or more analytical models from the external server, wherein the request comprises the local context;
    identifying component information at the external server based on the request;
    transmitting the component information to the mobile edge node; and
    loading one or more components at the mobile edge node based on the component information.

7. The method of claim 2, wherein receiving the additional analytical model from the external server to the mobile edge node comprises acquiring the additional analytical model based on the situational context, wherein the external server identifies the additional analytical model from the situational context.

8. The method of claim 1, wherein the external server creates the additional analytical model information using at least one of:
    principal component analysis;
    averaging;
    single parameter histograms;
    Markov models;
    Kalman filtering;
    edge detection, and
    clustering over a mathematical selection.

9. The method of claim 1, wherein identifying the change in the one or more communication link states based on the output of the analytical model uses one or more regular expressions to represent the change in the one or more communication link states.

10. The method of claim 1, further comprising:
executing at least one of commands and control applications, wherein the commands and the control applications gather model-related data on the mobile edge node;
transmitting the model-related data to the external server; and
building the analytical model on the external server.

11. A system comprising:
one or more components on a mobile edge node;
one or more memories within the mobile edge node;
one or more transceivers for transmitting and receiving communications for the mobile edge node; and
one or more processors configured to execute instructions that cause the one or more processors to:
receive an analytical model from an external server through the one or more transceivers;
store the analytical model in the one or more memories;
receive situation information for the mobile edge node from the one or more components on the mobile edge node, wherein the situation information describes at least one of:
position of the mobile edge node;
motion of the mobile edge node;
travel plans of the mobile edge node; and
current performance of one or more available communication links; and
use the analytical model to identify a change in one or more communication link states, wherein the analytical model generates an output based on the situation information, wherein the output predicts the availability of the one or more available communication links.

12. The system of claim 11, wherein using the analytical model comprises applying a plurality of policies to the one or more communication link states.

13. The system of claim 12, wherein the analytical model defines a software development kit for supporting plug-and-play of additional components.

14. The system of claim 11, wherein the one or more processors stores information as tuples related to local context, mobile edge node state parameters, and communication link parameters.

15. The system of claim 11, wherein the one or more processors execute the instructions that direct the one or more processors to select an additional analytical model using at least one of:
a principal component analysis;
averaging;
single parameter histograms;
Markov models;
Kalman filtering;
edge detection; and
clustering over a mathematical selection.

* * * * *